(12) United States Patent
Souvannarath

(10) Patent No.: US 8,862,938 B2
(45) Date of Patent: Oct. 14, 2014

(54) SYSTEM, METHOD, AND APPARATUS FOR RESOLVING ERRORS IN A SYSTEM

(75) Inventor: Manyphay Souvannarath, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 579 days.

(21) Appl. No.: 13/089,002

(22) Filed: Apr. 18, 2011

(65) Prior Publication Data

US 2012/0266020 A1 Oct. 18, 2012

(51) Int. Cl.
*G06F 11/00* (2006.01)
*G06F 11/07* (2006.01)

(52) U.S. Cl.
CPC ........ *G06F 11/0784* (2013.01); *G06F 11/0709* (2013.01); *G06F 11/0793* (2013.01)
USPC ................. 714/26; 714/51; 714/55; 714/735; 714/742; 714/25; 709/208; 709/209; 709/210; 709/211

(58) Field of Classification Search
CPC ............ G06F 11/0784; G06F 11/0709; G06F 11/0793
USPC .............. 709/208, 209, 210, 211; 714/51, 55, 714/735, 736, 742, 25, 26
See application file for complete search history.

(56) References Cited

U.S. PATENT DOCUMENTS

| | | | |
|---|---|---|---|
| 3,905,023 A | 9/1975 | Perpiglia | |
| 5,848,143 A * | 12/1998 | Andrews et al. | 379/265.09 |
| 6,023,507 A * | 2/2000 | Wookey | 709/224 |
| 6,516,326 B1 | 2/2003 | Goodrich et al. | |
| 6,615,376 B1 | 9/2003 | Olin et al. | |
| 6,941,247 B2 * | 9/2005 | Voigt et al. | 702/188 |
| 7,111,018 B1 | 9/2006 | Goodrich et al. | |
| 7,277,783 B2 * | 10/2007 | Predelli | 701/48 |
| 7,650,551 B2 | 1/2010 | Flautner et al. | |
| 2001/0016789 A1 * | 8/2001 | Staiger | 701/1 |
| 2002/0100017 A1 * | 7/2002 | Grier et al. | 717/120 |
| 2003/0105537 A1 * | 6/2003 | Crispin et al. | 700/20 |
| 2003/0149919 A1 * | 8/2003 | Greenwald et al. | 714/43 |
| 2004/0088140 A1 * | 5/2004 | O'Konski et al. | 702/183 |
| 2004/0225381 A1 * | 11/2004 | Ritz et al. | 700/26 |
| 2004/0236820 A1 * | 11/2004 | Flocken | 709/200 |
| 2005/0188268 A1 * | 8/2005 | Verbowski et al. | 714/37 |

(Continued)

FOREIGN PATENT DOCUMENTS

WO 9715008 A1 4/1997
WO 2007106569 A2 9/2007

OTHER PUBLICATIONS

Search Report and Written Opinion from EP Application No. 12164343.1 dated Jul. 5, 2012.

*Primary Examiner* — Joshua P Lottich
*Assistant Examiner* — Jeison C Arcos
(74) *Attorney, Agent, or Firm* — Armstrong Teasdale LLP

(57) ABSTRACT

A system includes at least one monitored device collect data detect and detect an error in the data, a central server, and at least one local server communicatively coupled to the monitored device and the central server. The local server is configured to receive the data and an indication of the error detected from the monitored device, determine a solution for use in resolving the error, transmit instructions to perform the solution to the monitored device, and transmit the error and the solution to the central server for storage.

20 Claims, 3 Drawing Sheets

(56) References Cited

U.S. PATENT DOCUMENTS

| | | | |
|---|---|---|---|
| 2005/0234824 A1* | 10/2005 | Gill et al. | 705/50 |
| 2006/0242286 A1* | 10/2006 | Hawkins et al. | 709/223 |
| 2007/0150480 A1* | 6/2007 | Hwang et al. | 707/10 |
| 2009/0028053 A1* | 1/2009 | Kannan et al. | 370/241 |

\* cited by examiner

SYSTEM, METHOD, AND APPARATUS FOR RESOLVING ERRORS IN A SYSTEM

BACKGROUND OF THE INVENTION

The embodiments described herein relate generally to computer systems and, more particularly, to detecting and resolving errors in a computer system using a self-learning algorithm.

At least some known networks, such as a utility grid network, include hardware for use in generating, transporting, measuring, and consuming electricity. Moreover, such networks often include hardware and software for use in collecting, exchanging, storing, and processing information that is generated with the network. However, at least some known networks do not provide a means for detecting, isolating, and resolving errors automatically. Moreover, at least some known networks do not enable the information-related hardware and software to continuously learn new solutions to errors.

BRIEF DESCRIPTION OF THE INVENTION

In one aspect, a method is provided for resolving data errors in a network including a monitored device, a local server communicatively coupled to the monitored device, and a central server communicatively coupled to the local server. The local server receives from the monitored device data collected by the monitored device and an indication of an error detected in the data by the monitored device, and determines a solution for use in resolving the error. The local server also transmits instructions to perform the solution to the monitored device, and transmits the error and the solution to the central server for storage.

In another aspect, a system includes at least one monitored device collect data detect and detect an error in the data, a central server, and at least one local server communicatively coupled to the monitored device and the central server. The local server is configured to receive the data and an indication of the error detected from the monitored device, determine a solution for use in resolving the error, transmit instructions to perform the solution to the monitored device, and transmit the error and the solution to the central server for storage.

In another aspect, a computer is provided for use with an error detection and resolution system that includes at least one monitored device and a central server coupled to the computer via a network. The computer includes a memory area configured to store a plurality of known errors and a plurality of possible solutions to each of the plurality of known errors. The computer also includes a processor coupled to the memory area and configured to receive data collected by the monitored device and an indication of an error detected in the data by the monitored device. The processor determines a solution of the known solutions for use in resolving the error by comparing the error to the known errors, transmits instructions to perform the solution to the monitored device, and transmits the error and the solution to the central server for storage.

DETAILED DESCRIPTION OF THE INVENTION

Exemplary embodiments of systems, methods, and apparatus for use in resolving errors in a system are described hereinabove. The embodiments described herein facilitate providing a more reliable and efficient networked system, such as a utility power grid, by more quickly detecting and resolving errors. For example, the embodiments described herein enable continuous monitoring of an information network for errors, isolating errors when detected, resolving the errors locally when possible, and using self-learning computer technology to continuously analyze error and solution data to determine solutions that may be applied to multiple errors or error types.

Exemplary technical effects of the systems, methods, and apparatus described herein include at least one of: (a) continuously analyzing data collected by a monitored device to detect an error; (b) determining a solution to the error at a local server that is communicatively coupled to the monitored device at a site; (c) when a solution is determined by the local server, transmitting a command to the monitored device, including an action to be performed in an attempt to resolve the error; (d) reporting to the local server, by the monitored device, whether the action was successful in resolving the error; (e) if multiple solutions were determined by the local server, transmitting a second command to the monitored device when the first action was unsuccessful in resolving the error; (f) if no solution was determined by the local server, determining a solution to the error at a central server that is communicatively coupled to the local server; (g) when a solution is determined by the central server, transmitting a command to the monitored device via the local server, including an action to be performed in an attempt to resolve the error; and (h) periodically transmitting updated error and solution analyses from the central server to the local server for use in subsequent error analysis and resolution.

Figure 1:
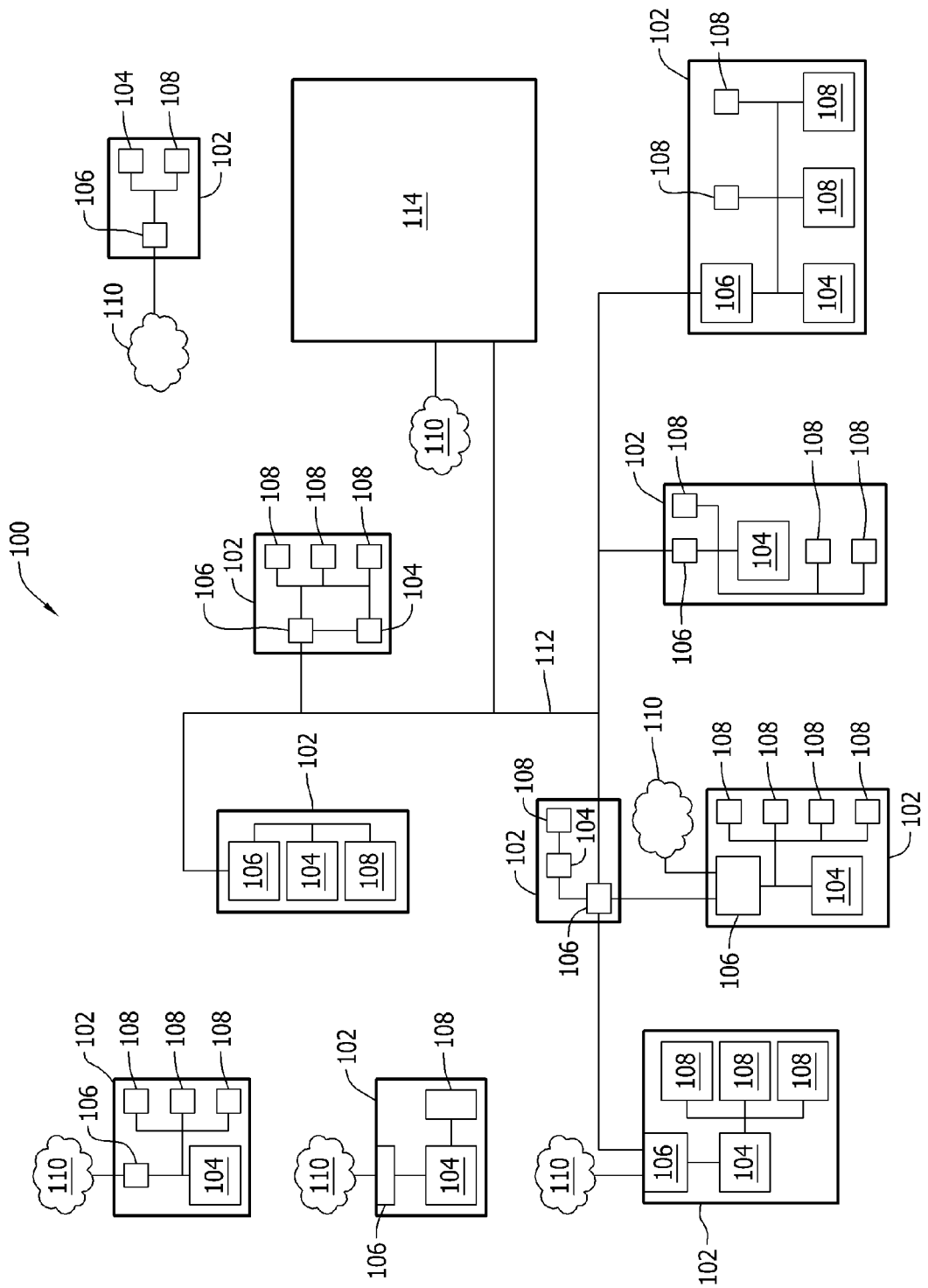
FIG. 1 is a schematic block diagram of an exemplary networked system.

FIG. 1 is a schematic block diagram of an exemplary networked system 100. In the exemplary embodiment, system 100 is a utility grid. However, system 100 may be any suitable networked system that enables the data error resolution processes described herein.

In the exemplary embodiment, system 100 includes a plurality of sites 102. Sites 102 may be, for example and without limitation, residential subsystems including single-family homes and/or multi-family homes, business subsystems, an energy market subsystem, electric vehicle and/or hybrid electric vehicle plug-in charging stations, industrial subsystems, power plant subsystems, power grid substation subsystems, or any other suitable system or subsystem. Residential subsystems may be fully-automated power consumers controlled by a controller (not shown), partially-automated power consumers, or power consumers without any automation. Similarly, business subsystems may be automated or non-automated power consumers. In the exemplary embodiment, each site 102 includes a local server 104, a network interface device 106, and one or more monitored devices 108. Network interface device 106 enables local server 104 and monitored devices 108 to transmit and/or receive communication signals via one or more networks, such as the Internet 110 and/or network 112. Exemplary network interface devices 106 include, but are not limited to only including, routers, modems, smartjacks, network computer cards, or any other suitable device that facilitates transmitting and/or receiving communication signals via network. Network 112 may be any suitable network and may include a plurality of networks for simultaneously delivering data generated by monitored devices 108 and/or local servers 104. Moreover, in some embodiments, network 112 is an electric network for use in generating, transporting, measuring, and/or consuming electricity. Moreover, in some embodiments, network 112 is an information network for use in collecting, exchanging, storing, and/or processing data generated by components the electric network. Furthermore, in some embodiments, network 112 is an error resolution network for use in monitoring the information network, identifying abnormalities within data collected by monitored devices 108, isolating problems, and/or resolving problems or errors using a self-learning computer system.

In the exemplary embodiment, system 100 also includes a central server 114 that is communicatively coupled to local servers 104 via Internet 110 and/or network 112. Central server 114 stores a plurality of errors detected by monitored devices 108 and a plurality of solutions or actions for use in resolving the errors. Furthermore, central server 114 facilitates determining a solution to attempt for a given error. Central server 114 can also be used to associated solutions and errors, such that when a first solution does not resolve an error, a second solution can be proposed that may resolve the error.

Figure 2:
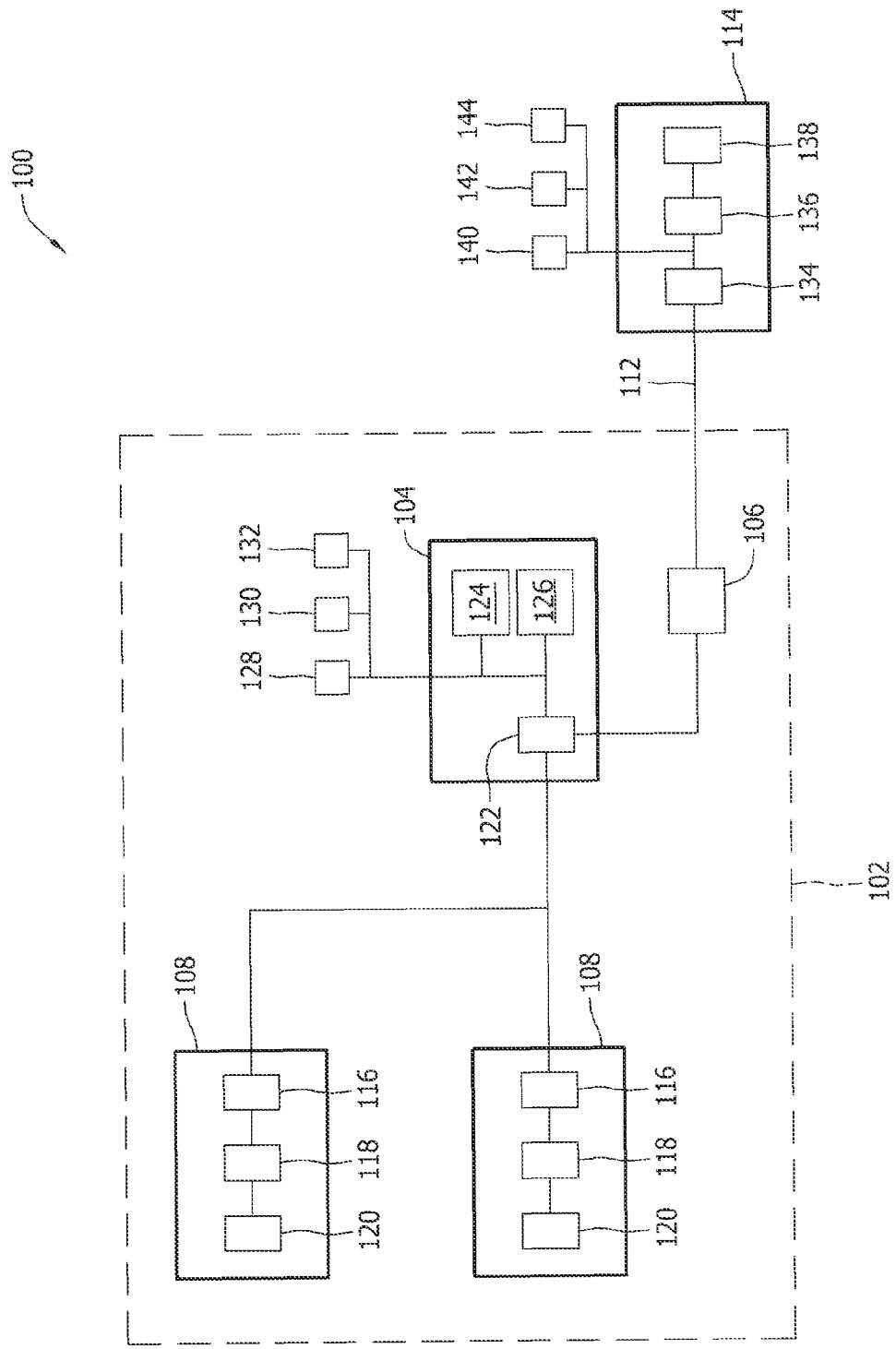
FIG. 2 is a simplified block diagram of the system shown in FIG. 1.

FIG. 2 is a simplified block diagram of system 100. In the exemplary embodiment, each monitored device 108 includes a network interface 116, a processor 118, and a memory area 120. Network interface 116 enables monitored device 108 to transmit communication signals to an associated local server 104 and/or to receive communication signals from an associated local server 104. Memory area 120 stores data such as voltage data, current data, power generation data, power consumption data, and/or any other suitable information that can be collected in memory area 120 and/or transmitted to local server 104. Moreover, memory area 120 stores computer-readable instructions for detecting errors in the collected data, such as a firmware.

In the exemplary embodiment, each local server 104 includes a network interface 122, a processor 124, and a memory area 126. Moreover, in some embodiments, local server 104 includes user interface devices such as a keyboard 128, a mouse 130, and/or a display device 132. In the exemplary embodiment, network interface 122 enables local server 104 to transmit communication signals to monitored device 108 and/or central server 114, and/or to receive communication signals from monitored device 108 and/or central server 114. Memory area 126 stores data received from monitored devices 108. Moreover, as described in greater detail below, memory area 126 stores a plurality of errors detected by monitored devices 108 and a plurality of solutions or actions for use in resolving the errors. For example, an error may be resolved by one or more solutions or actions that are performed by monitored device 108 according to details of the error, such as an error type. Furthermore, memory area 126 stores computer-readable instructions for use in determining a solution to attempt for a given error.

Moreover, in the exemplary embodiment, central server 114 includes a network interface 134, a processor 136, and a memory area 138. Moreover, in some embodiments, central server 114 includes user interface devices such as a keyboard 140, a mouse 142, and/or a display device 144. In the exemplary embodiment, network interface 134 enables central server 114 to transmit communication signals to local servers 104, and/or to receive communication signals from local servers 104. Memory area 138 stores data received from monitored devices 108 via local servers 104. Moreover, as described in greater detail below, memory area 138 stores a plurality of errors detected by monitored devices 108 and a plurality of solutions or actions for use in resolving the errors. Furthermore, memory area 138 stores computer-readable instructions for use in determining a solution to attempt for a given error. The computer-readable instructions can also be used to associated solutions and errors, such that when a first solution does not resolve an error, a second solution can be proposed that may resolve the error. Accordingly, processor 136 and memory area 138 enable central server 114 to continuously evaluate errors and solutions to link multiple solutions to similar or related errors. For example, monitored device 108 may detect an error that is not stored in memory area 126 or does not have an associated solution stored in memory area 126. Processor 136 and memory area 138 can be used to determine a similar error type that may be resolved using an existing solution. Moreover, an operator may input new solutions via keyboard 140 and/or mouse 142 for storing in memory area 138. In the exemplary embodiment, central server 114 repeatedly transmits, such as periodically transmits, at least a portion of the stored error and solution relationships to local servers 104 such that local servers 104 can resolve the errors locally. This facilitates a faster response to a subsequently detected error.

During operation, and in the exemplary embodiment, monitored device processor 118 collects data and stores the data in memory area 120. Moreover, processor 118 monitors and analyzes the collected data to detect errors. For example, processor 118 executes the computer-readable instructions, which cause processor 118 to compare the data to predetermined limits, such as an upper limit and/or a lower limit, detect whether the data structure is incomplete, and/or detect unexpected data values. When processor 118 detects an error, processor 118 transmits a signal indicative of the error to an associated local server 104. In some embodiments, processor 118 also detects an error type and transmits the data and/or the error type to local server 104.

In the exemplary embodiment, local server processor 124 receives the data and/or the error from monitored device 108. In some embodiments, processor 124 stores the data and/or the error in memory area 126 in association with, for example, a unique identifier of the originating monitored device 108. In the exemplary embodiment, processor 124 executes the computer-readable instructions, which cause processor 124 to attempt to identify a solution that is associated with the error. The solution may be known to resolve the error or may be believed to resolve the error based on other error-solution relationships stored in memory area 126. For example, error may have a unique identifier or may be labeled with an error type. Processor 124 can then determine an associated solution in memory area 126 by searching for the error identifier or error type.

Moreover, if processor 124 identifies a solution, processor 124 transmits a command to monitored device 108. In response to the command, monitored device 108 performs an action associated with the solution. If the solution resolves the error, monitored device 108 transmits a message to local server 104 indicating the successful resolution. Local server 104 indicates that the solution can be used to resolve the same error in memory area 126, and transmits the error and the solution to central server 114 for storage. In the exemplary embodiment, central server processor 114 receives the data and/or the error from local server 104. In some embodiments, processor 136 stores the data and/or the error in memory area 138 in association with, for example, a unique identifier of the originating monitored device 108 and/or a unique identifier of the originating local server 104.

However, if the solution does not resolve the error, monitored device 108 transmits a message to local server 104 indicating the failure. If more than one solution is associated with the error in memory area 126, local server 104 transmits a command to monitored device 108 to perform an action associated with a different solution, and transmits the error, the attempted solution, and the result to central server 114 for storage. If local server 104 does not detect additional possible solutions associated with the error, local server 104 transmits the error and/or data to central server 114. Central server processor 136 executes the computer-readable instructions, which cause processor 136 to attempt to identify a solution that is associated with the error. The solution may be known to resolve the error or may be believed to resolve the error based on other error-solution relationships stored in memory area 138. If processor 136 identifies a solution, processor 136 transmits a command to local server 104, which transmits a command to monitored device 108 indicating the action to be performed. In response to the command, monitored device 108 performs the action associated with the solution. If the solution resolves the error, monitored device 108 transmits a message to local server 104 indicating the successful resolution. If no solution is successfully, central server 114 generates an alarm, such as a visual and/or aural alarm, to alert an operator. The operator can then input a solution, which is transmitted by central server 114 to local server 104, and is executed by monitored device 108 as described above.

In the exemplary embodiment, the operator can also configure the errors, solutions, and/or the actions associated with the solutions using central server 114. For example, the operator can adjust accept boundary values of system variables, and/or enter new errors, solutions, and/or actions. As described above, central server 114 transmits known errors, solutions, and/or actions to local servers 104 for storage and for use in analysis of future errors.

By way of example only, and in one embodiment, monitored device 108 is a bay controller in a power distribution automation subsystem. The bay controller is configured to execute an immunity firmware that detects errors. For example, the bay controller periodically transmits voltage data to a utility subsystem for use in billing. The bay controller executes the immunity firmware to detect an error, such as by comparing the voltage data to known upper and/or lower limit values. The bay controller identifies the type of error, such as an out-of-range error, and transmits the error, error type, and/or the data to local server 104. Local server 104 analyzes the error, error type, and/or the data to identify one or more potential solutions to the error. Local server 104 identifies a potential solution and transmits a command to the bay controller, such as a restart command. The bay controller executes the command and completes a restart, and then determines whether the error still exists or has been resolved. The bay controller reports back to local server 104 accordingly. If the error is been resolved, local server 104 transmits the error, error type, and/or the data, as well as the action, to central server 114 for storage in memory area 138. If the error is not resolved, local server 104 transmits a different command to the bay controller. If local server 104 cannot determine a first solution or any subsequent solution, central server 114 performs the same analysis based on data received from other local servers 104.

Figure 3:
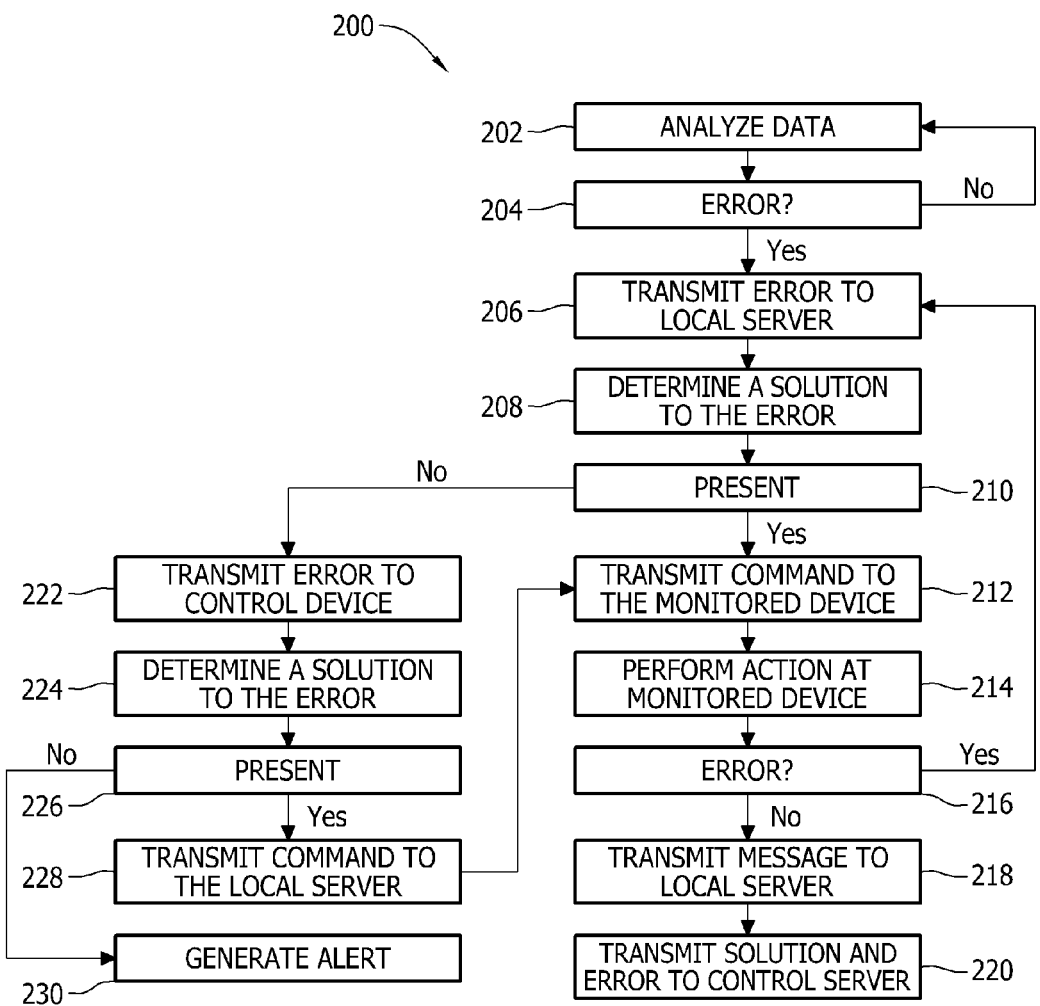
FIG. 3 is a flowchart that illustrates an exemplary method for resolving data errors in the system shown in FIGS. 1 and 2.

FIG. 3 is a flowchart 200 that illustrates an exemplary method for resolving data errors in a system, such as system 100 (shown in FIGS. 1 and 2). In the exemplary embodiment, monitored device 108 (shown in FIGS. 1 and 2) collects and analyzes 202 data during operation. If no error is detected 204 during the analysis, monitored device 108 continues normal operation. However, if an error is detected 204, monitored device 108 transmits 206 the error, an error type, and/or the data having the error to local server 104 (shown in FIGS. 1 and 2).

In the exemplary embodiment, local server 104 attempts to determine 208 one or more solutions to the error. For example, local server 104 identifies the error or error type via a unique identifier, keyword, or data type, and attempts to determine one or more solutions in memory area 126 (shown in FIG. 2). If local server 104 determines that a solution is present 210, local server 104 transmits 212 a command related to the solution, including an action to be taken by monitored device 108. In response to the command, monitored device 108 performs 214 the action and re-analyzes the data. If the error is not detected 216, monitored device 104 transmits 218 a message to local server 104 indicating that the error has been resolved. Local server 104 transmits 220 a message to central server 114 (shown in FIGS. 1 and 2) indicating the error, the error type, and/or the data having the error to central server 114 for storage in memory area 138 (show in FIG. 2).

If local server 104 determines that no solution is present 210 in memory area 126, local server 104 transmits 222 the error, the error type, and/or the data having the error to central server 114. In the exemplary embodiment, central server 114 attempts to determine 224 one or more solutions to the error. For example, central server 114 identifies the error or error type via a unique identifier, keyword, or data type, and attempts to determine one or more solutions in memory area 138. If central server 114 determines that a solution is present 226, central server 114 transmits 228 to local server 104 a command related to the solution, including an action to be taken by monitored device 108. Local server 104 transmits 212 the command to monitored device 108, which performs 214 the action and re-analyzes the data as described above. If central server 114 determines that no solution is present 226 in memory area 138, central server 114 generates 230 an alert to an operator.

If the error is detected 216 after performing the action, monitored device 108 transmits 206 the error, the error type, and/or the data having the error to local server 104. If local server 104 has determined 208 more than one solution, local server 104 transmits 212 a second command related to a second solution, including a second action to be taken by monitored device 108.

Exemplary embodiments of systems, methods, and apparatus for resolving data errors in a system are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer or server, such as those described herein, includes at least one processor or processing unit and a system memory. The computer or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary utility grid computer system environment, embodiments of the invention are operational with numerous other general purpose or special purpose utility grid computer system environments or configurations. The utility grid computer system environment is not intended to suggest any limitation as to the scope of use or functionality of any aspect of the invention. Moreover, the utility grid computer system environment should not be interpreted as having any dependency or requirement relating to any one or combination of components illustrated in the exemplary operating environment. Examples of well known utility grid computer systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Moreover, the term "memory area" refers generally to any storage medium that stores program code and instructions, executable by a processor. Exemplary types of memory may include one, or more than one, forms of memory. For example, a memory area can include random access memory (RAM), which can include non-volatile RAM (NVRAM), magnetic RAM (MRAM), ferroelectric RAM (FeRAM) and other forms of memory. A memory area may also include read only memory (ROM), flash memory and/or Electrically Erasable Programmable Read Only Memory (EEPROM). Any other suitable magnetic, optical and/or semiconductor memory, by itself or in combination with other forms of memory, may be included in a memory area. A memory area may also be, or include, a detachable or removable memory, including, but not limited to, a suitable cartridge, disk, CD ROM, DVD or USB memory.

In some embodiments, the memory area may be a database. It should be understood that the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of resolving data errors in a system including a monitored device, a central server, and a local server communicatively coupled to the monitored device and the central server, said method comprising:

receiving, by the local server from the monitored device, data collected by the monitored device and an indication of an error detected in the data by the monitored device;

determining, by the local server, a solution for use in resolving the error;

transmitting, by the local server to the monitored device, instructions to perform the solution;

receiving, by the local server, an acknowledgement from the monitored device when the solution performed by the monitored device resolves the error; and transmitting, by the local server to the central server, the error and the solution for storage by the central server.

2. A method in accordance with claim 1, further comprising analyzing, by the monitored device, the data to detect the error.

3. A method in accordance with claim 1, further comprising, determining, by the monitored device, an error type of the error.

4. A method in accordance with claim 3, wherein determining a solution for use in resolving the error comprises determining the solution based on the error type.

5. A method in accordance with claim 1, wherein, when the local server does not determine the solution, said method further comprises transmitting the error by the local server to the central server.

6. A method in accordance with claim 5, further comprising:
determining the solution for use in resolving the error, by the central server; and
transmitting the solution to the local server.

7. A method in accordance with claim 6, wherein, when the central server does not determine the solution, said method further comprises generating an alert by the central server.

8. A method in accordance with claim 1, wherein the system includes a plurality of monitored devices and a plurality of local servers, said method further comprising storing, by the central server, a plurality of errors detected by the plurality of monitored devices and a plurality of solutions for use in resolving the plurality of errors.

9. A method in accordance with claim 8, further comprising transmitting, by the central server to the plurality of local servers, the plurality of errors and the plurality of solutions for storage by the plurality of local servers.

10. A system comprising:
at least one monitored device for collecting data for use in detecting an error in the data;
a central server; and
at least one local server communicatively coupled to said at least one monitored device and said central server, said at least one local server configured to:
receive the data and an indication of the error detected from said at least one monitored device;
determine a solution for use in resolving the error;
transmit instructions to perform the solution to said at least one monitored device;
receive, by the local server, an acknowledgement from said at least one monitored device when the solution performed by said at least one monitored device resolves the error; and
transmit the error and the solution to said central server for storage.

11. A system in accordance with claim 10, wherein said at least one monitored device is configured to:
analyze the data to detect the error; and
determine an error type of the error.

12. A system in accordance with claim 11, wherein said at least one local server is configured to determine the solution for use in resolving the error based on the error type.

13. A system in accordance with claim 10, wherein said at least one local server is further configured to transmit the error to said central server when said at least one local server does not determine the solution.

14. A system in accordance with claim 13, wherein said central server is configured to:
determine the solution for use in resolving the error; and
transmit the solution to said at least one local server.

15. A system in accordance with claim 14, wherein said central server is further configured to generate an alert when said central server does not determine the solution.

16. A system in accordance with claim 10, wherein said at least one monitored device comprises a plurality of monitored devices and said at least one local server comprises a plurality of local servers, said central server further configured to:
store a plurality of errors detected by said plurality of monitored devices and a plurality of solutions for use in resolving the plurality of errors; and
transmit the plurality of errors and the plurality of solutions to said plurality of local servers, said plurality of local servers further configured to store the plurality of errors and the plurality of solutions.

17. A local server for use with an error detection and resolution system including at least one monitored device, a local server and a central server coupled to said computer via a network, said local server comprising:
a memory area configured to store a plurality of known errors and a plurality of possible solutions to each of the plurality of known errors; and
a processor coupled to said memory area and configured to:
receive, from the at least one the monitored device, data collected by the at least one monitored device and an indication of an error detected in the data by the at least one monitored device;
determine a solution of the plurality of known solutions for use in resolving the error by comparing the error to the plurality of known errors;
transmit instructions to perform the solution to the at least one monitored device;
receive, by said local server, an acknowledgement from the at least one monitored device when the solution performed by the at least one monitored device resolves the error; and
transmit, by said local server, the error and the solution to the central server for storage.

18. A local server in accordance with claim 17, wherein said processor is further configured to:
transmit the error to the central server when said processor server does not determine the solution from the plurality of known solutions;
receive the solution from the central server.

19. A local server in accordance with claim 17, wherein said processor is further configured to:
receive a plurality of errors and a plurality of solutions associated with the plurality of errors; and
store the plurality of errors and the plurality of solutions in said memory area for use in resolving a subsequent error.

20. A local server in accordance with claim 17, wherein said processor is further configured to:
receive a second error from the at least one monitored device when the solution performed by the at least one monitored device does not resolve the error;
determine a second solution of the plurality of known solutions for use in resolving the error;
transmit instructions to perform the second solution to the at least one monitored device; and
transmit the error and at least the second solution to the central server for storage.

* * * * *